United States Patent
Weiss et al.

(10) Patent No.: US 7,042,177 B2
(45) Date of Patent: May 9, 2006

(54) METHOD AND SYSTEM FOR ELECTRONIC BRAKING OF AN ELECTRIC MOTOR HAVING NO PERMANENT MAGNETS

(75) Inventors: Darrin M. Weiss, Vestal, NY (US); Andrew Zalesski, Apalachin, NY (US)

(73) Assignee: Universal Instruments Corporation, Binghamton, NY (US)

(*) Notice: Subject to any disclaimer, the term of this patent is extended or adjusted under 35 U.S.C. 154(b) by 0 days.

(21) Appl. No.: 10/911,953

(22) Filed: Aug. 5, 2004

(65) Prior Publication Data

US 2006/0028160 A1    Feb. 9, 2006

(51) Int. Cl.
*H02P 3/18*    (2006.01)
(52) U.S. Cl. ........................ 318/364; 318/365
(58) Field of Classification Search ............... 318/362, 318/364–370, 375–381
See application file for complete search history.

(56) References Cited

U.S. PATENT DOCUMENTS

| | | | | |
|---|---|---|---|---|
| 3,786,329 A | | 1/1974 | Whited | |
| 3,832,613 A | | 8/1974 | Bernstein et al. | |
| 3,855,512 A | * | 12/1974 | Konrad | 318/366 |
| 3,989,990 A | * | 11/1976 | Thompson | 318/139 |
| 4,767,970 A | | 8/1988 | Rodal | |
| 4,926,101 A | * | 5/1990 | Enomoto et al. | 318/374 |
| 5,659,231 A | * | 8/1997 | Svarovsky et al. | 318/368 |
| 5,828,195 A | | 10/1998 | Zalesski | |
| 6,242,874 B1 | * | 6/2001 | Kalpathi et al. | 318/254 |
| 6,373,207 B1 | * | 4/2002 | Yablonovitch | 318/362 |
| 6,741,050 B1 | | 5/2004 | Wissmach et al. | |
| 2002/0079751 A1 | | 6/2002 | Janisiewicz et al. | |

OTHER PUBLICATIONS

Franklin, et al. "Feedback Control of Dynamic Systems", third edition, Addison-Wesley Publishing Company, 1994. Section 3.4 shows the Time-Domain Specifications of a system's dynamic response.*

* cited by examiner

*Primary Examiner*—Bentsu Ro
(74) *Attorney, Agent, or Firm*—Schmeiser, Olsen & Watts

(57) ABSTRACT

System for braking either linear or rotary electric motor having no permanent magnets comprising at least one servo amplifier and an electronic circuit for generating a pulsed control signal for controlling the braking of the motor. The electronic circuit of the present invention may be responsive to any emergency such as loss of the line power, a motion controller failure, or actuation of a limit switch by a driven member. A method of braking is also disclosed.

6 Claims, 3 Drawing Sheets

METHOD AND SYSTEM FOR ELECTRONIC BRAKING OF AN ELECTRIC MOTOR HAVING NO PERMANENT MAGNETS

BACKGROUND OF THE INVENTION

1. Technical Field

The present invention relates to the field of dynamic brakes for electric motors, and, more particularly, to an electronic braking circuit system and method for providing an electromotive braking force for an electric motor having no permanent magnets, for example, in an emergency situation such as a motion controller failure, or actuation of a limit switch by a driven member of a linear motor.

2. Related Art

Braking of electric motors having permanent magnets typically is accomplished by shorting the motor coils, for example, through a resistor thereby applying a large load to the electromotive force generated in the motor's coils in the presence of permanent magnets. Of course, such a solution is not possible with motors having no permanent magnets. For example, according to U.S. Pat. No. 3,832,613, a permanent magnet motor is simply controlled by a dynamic brake 162 which takes advantage of the generator action of the motor to create a reverse torque for braking. Dynamic brakes for DC motors are also described in U.S. Pat. Nos. 3,786,329 and 4,767,970.

A method and system for braking an electric motor having no permanent magnets is described in U.S. Pat. No. 5,828,195. However, the braking system according to this patent incorporates position tracking sensors, which, inter alia, significantly increases the cost of the system. In addition, for braking a linear motor the sensors have to be mounted on the moving member, which requires special fixtures and expensive flex cables. The accuracy of the location of the sensor in relation to the specific motor parts is very critical, because a small displacement from the optimum position can significantly affect the braking performance or even cause acceleration of the motor.

It can be seen from above, that there exists in the art a requirement for a system and method, of braking without using any position tracking devices, for braking an electric motor having no permanent magnets.

Thus, it is one object of the present invention to provide a sensorless braking system for utilization in braking electric motors having no permanent magnets.

SUMMARY OF THE INVENTION

The problems and failures of the prior art are solved by the principles of the present invention, an electronic sensorless braking system which applies pulsed current to at least one phase coil of the motor for reversing and thereby braking motor movement (in the case of a linear motor) or rotation (in the case of a rotational motor).

In a first general aspect, the present invention provides a system for braking either a linear or rotary electric motor having no permanent magnets and having either a stator or a rotor with equally spaced teeth comprising:

at least one servo amplifier, having an output and current error signal;

at least one motor phase coil connected said output;

at least one electronic circuit responsive to said current error signal, and producing a current command required for braking; and means for said servo amplifier to use said current command to produce a current necessary for braking in said motor phase coil.

DETAILED DESCRIPTION OF THE INVENTION

Figure 1:
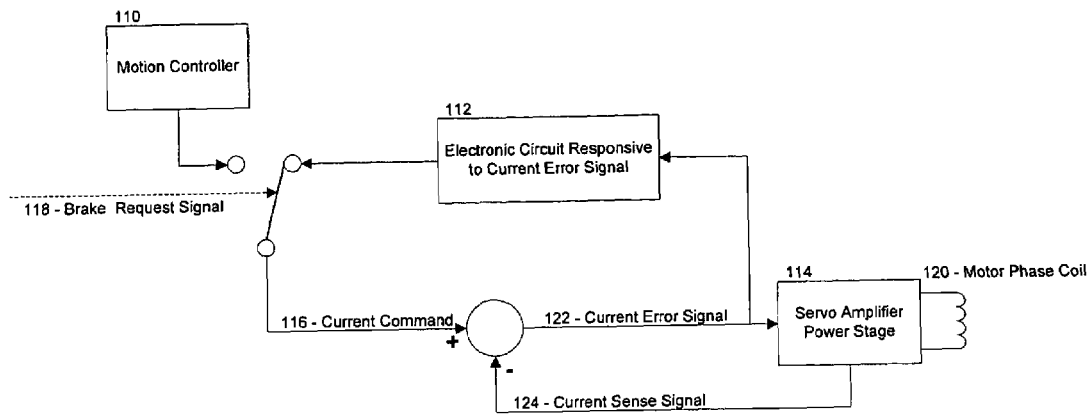
FIG. 1 depicts a schematic view of an embodiment of a system, in accordance with the present invention.

Although certain embodiments of the present invention will be shown and described in detail, it should be understood that various changes and modifications may be made without departing from the scope of the appended claims. The scope of the present invention will in no way be limited to the number of constituting components, the materials thereof, the shapes thereof, the relative arrangement thereof, etc., and are disclosed simply as an example of an embodiment. The features and advantages of the present invention are illustrated in detail in the accompanying drawings, wherein like reference numerals refer to like elements throughout the drawings.

As a preface to the detailed description, it should be noted that, as used in this specification and the appended claims, the singular forms "a", "an" and "the" include plural referents, unless the context clearly dictates otherwise.

The present invention is directed to the braking of an electric motor without permanent magnets in an emergency through the generation of an electromotive force opposite to the direction of motor motion. This braking is employed in the event motor motion must be rapidly ceased as a result of an emergency. Examples include but are not limited to motion controller system failure, limit switch actuation, line power failure, or any other emergency event which should trigger the braking force.

The present invention will be described in the context of an uncoupled variable reluctance linear motor used for moving a member from one end of a linear track to another. As used herein, the term uncoupled describes the arrangement where each phase of the motor produces magnetic flux that is for practical purposes not coupled to other phases. Such linear motors are typically utilized in robotic systems, for example, pick and place systems, in which a first linear motor moves a beam mounted to a sliding device along one axis and a second linear motor moves a carriage along the beam on an orthogonal axis so as to provide Cartesian movement of robotics end effector mounted on the carriage over a desired work area. The present invention is not limited to this use. It may also be used to brake many electric motor types, which have no permanent magnets. The present invention also is adaptable to rotary motors.

The first number of each element in a given figure represents the figure number where said element first appears. For a given element, the same element number is used in subsequent figures in which said element appears.

Figure 2:
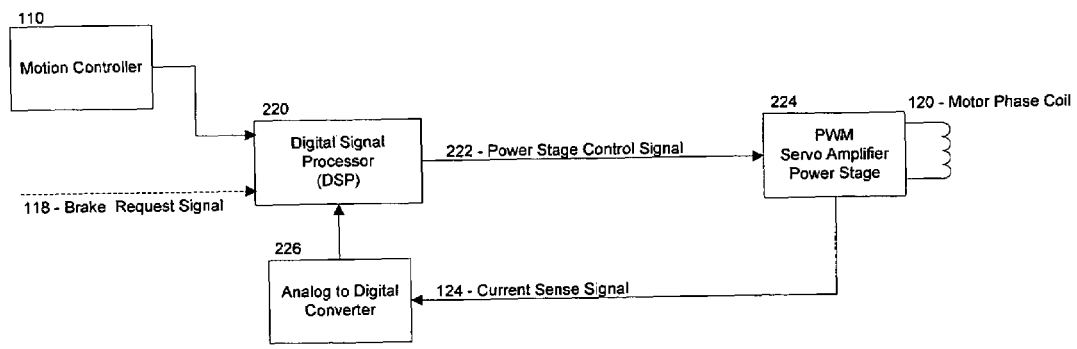
FIG. 2 depicts a schematic view of a second embodiment of a system wherein a digital signal processor (DSP calculates the current error signal, in accordance with the present invention.

FIGS. 1 and 2 show a servo system controlled via a motion controller 110. The motion controller 110, using data from an encoder (not shown), provides a control signal (current command 116) to achieve a desired motor movement. In the event of an emergency, such as a motion controller system failure, a braking system is required for braking the motor. This braking system is the subject of this invention.

FIG. 1 further shows all signals used to generate the pulsing output current in a motor phase coil 120 necessary for braking. It also shows how the current error signal 122 is calculated: by subtraction of the current sense signal 124 from the current command signal 116. This is the definition of the current error signal 122 used in the following detailed description. A dotted line indicates how the brake request signal 118 disconnects the motion controller 110 from the servo amplifier and connects the current command 116 from the output of the electronic circuit responsive to the current error signal 112 to the servo amplifier input.

With regards to FIG. 2, in an embodiment, the current sense signal 124 is converted to digital signal by an analog to digital converter 226 connected to the digital signal processor (DSP) 220. The Brake Signal request 118 is also connected to the DSP 220. It initiates the braking process according to the flow chart shown in FIG. 3. DSP 220 generates the current command signal 116 in response to the current error signal 124. The embodiment uses a PWM servo amplifier power stage 224, and the DSP 220 converts the current command signal 116 to the power stage control signal(s) 222.

Figure 3:
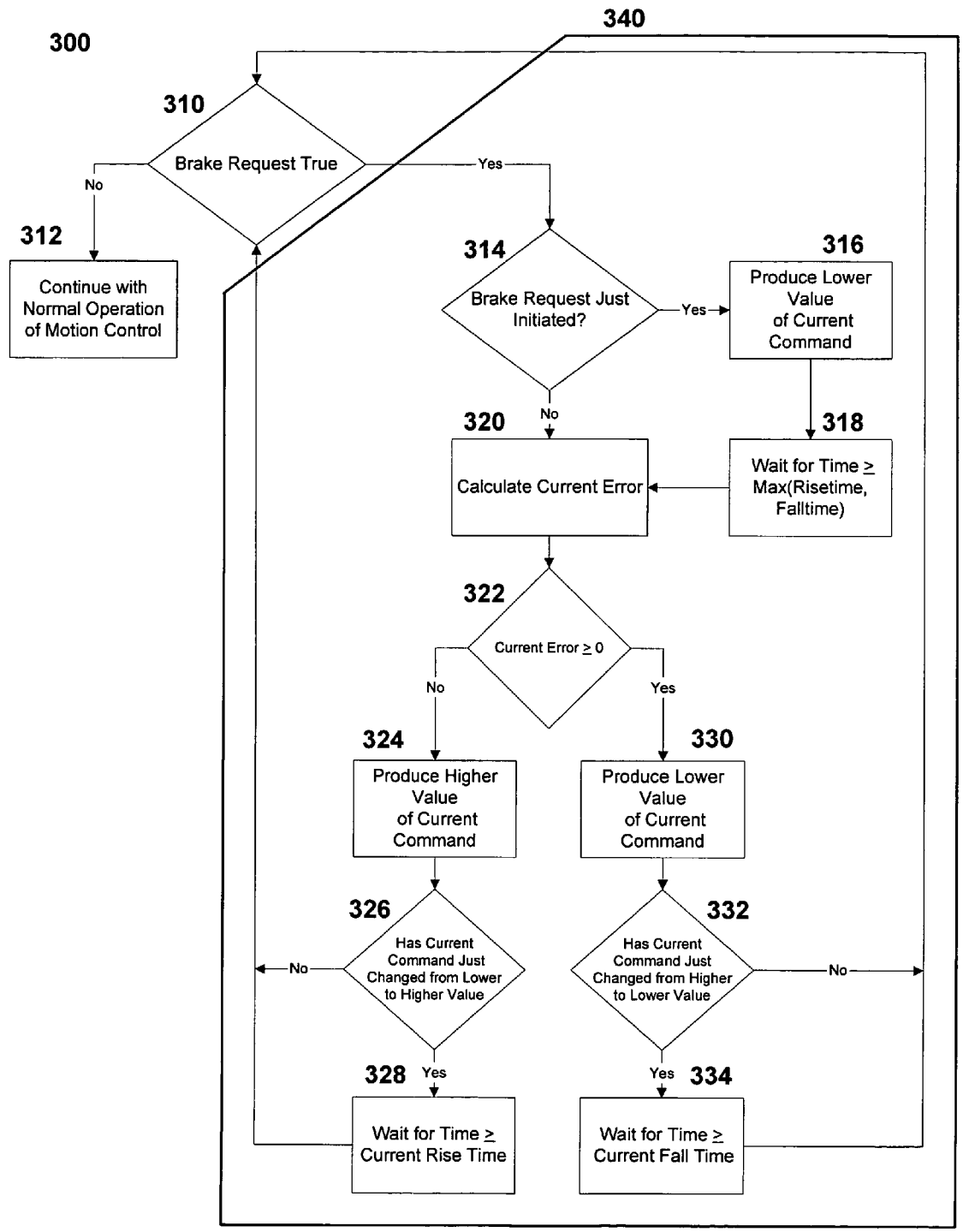
FIG. 3 depicts a method, or flowchart, in accordance with the present invention.
Figure 4:
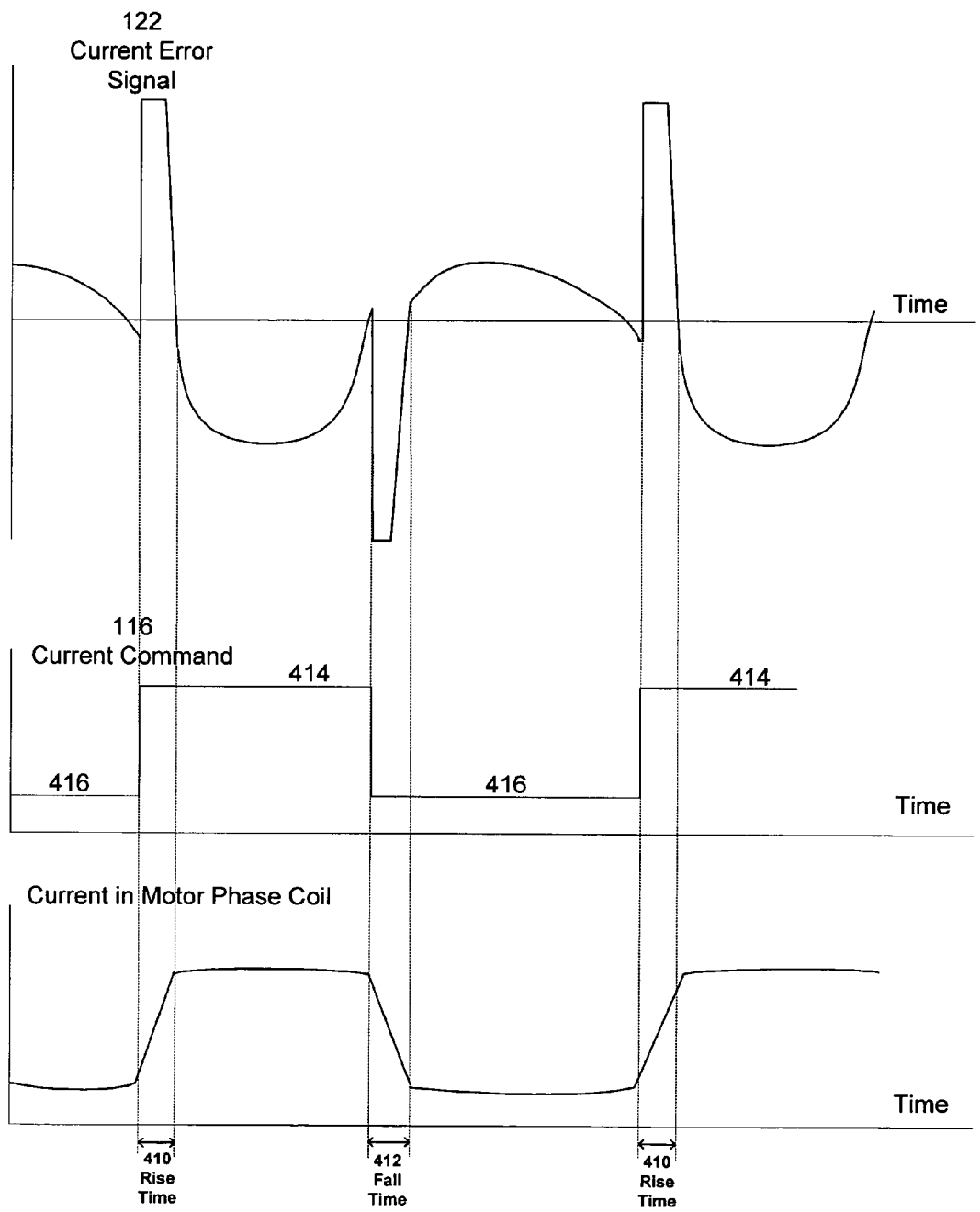
FIG. 4 depicts the current error signal, the current command, and the current in the motor phase coil as a function of time during the braking process, in accordance with the present invention.

Referring now to FIGS. 3 and 4, if there is an event which triggers an emergency brake request signal, control is switched from the normal operation of the motion control procedure, Step 312, to the braking procedure, Step 340, to provide a control signal for braking. The first step of braking procedure 340 is to determine if the brake request was just initiated, Step 314, if so then produce a lower value of current command, Step 316 and wait for greater of rise time or the fall time, Step 318. The next step is to calculate the current error, Step 320. If the calculated current error is greater than or equal to zero then a lower level current command 116 is produced, Step 330, else if the current error is less than zero a higher level current command 116 is produced, Step 324. This procedure includes waiting for a specific period of time after each current command 116 change. This time is required in order for the circuit to avoid responding to the effect of the rise time 410 or fall time 412 of the current in the motor phase coils 120 on the current error signal 122. It has to be at least as long as the rise time 410 when current command 116 changes to the higher value 414, Step 328, or at least as long as the fall time 412 of this current when current command 116 changes to the lower value 412, Step 334. This time can be found experimentally for each motor.

FIG. 4 illustrates the effect of the current rise time 410 and fall time 412 on the current error signal during the braking process. In this illustration, the current error 122 starts out above zero, and the current command 116 and the current in the motor phase coil are at their lower values. The current error signal eventually falls below zero and the current command 116 changes from a lower value 416 to a higher value 414. In response to this, the phase current in the motor coil starts to increase. During the current rise time 410, the current error signal 122 is positive. One may wait at least as long as the rise time 410 before responding to the change of current error signal in order to avoid continuous oscillation of the current command 116. The current error signal returns to below zero when the current in the phase coil reaches its higher value.

When the current error signal 122 becomes greater than zero, the current command 116 changes from a higher value 414 to a lower value 416. In response to this the phase current in the motor coil starts to decrease. During the current fall time 412, current error signal 122 is negative. One may wait at least as long as the fall time 412 before responding to the change of current error signal in order to avoid continuous oscillation of the current command 116. The current error signal returns to above zero when the current in the phase coil reaches its lower value.

The above description provides a basic description of the operation of the braking system. Numerous variations are appropriate to achieve variations in performance, reliability, size, ease of manufacturing, cost, and other design features. Moreover, with experimentation, different versions may better suit other specific applications. Other embodiments and applications of the present invention may come to mind by reading the above description of the present invention. Moreover, the scope of the present invention should only be deemed to be limited by the claims that follow.

The invention claimed is:

1. A system for braking either a linear or rotary electric motor having no permanent magnets and having either a stator or a rotor with equally spaced teeth comprising:
   at least one servo amplifier, having an output and current error signal;
   at least one motor phase coil connected to said output;
   at least one electronic circuit responsive to said current error signal, and producing a current command required for braking; and
   means for said servo amplifier to use said current command to produce a current necessary for braking in said motor phase coil,
   wherein said electronic circuit is not responsive to changes of said current error signal for a an experimentally determined period of time after each change of said current command.

2. The system for braking an electric motor according to claim 1 wherein said current command produced by said electronic circuit has a higher value, when said current error signal is negative, and a lower value when said current error signal is positive.

3. The system for braking an electric motor according to claim 1 wherein said experimentally determined period of time is at least as long as a rise time of said current in said motor phase coil when said current command changes from said lower value to said higher value.

4. The system for braking an electric motor according to claim 1 wherein said experimentally determined period of time is at least as long as a fall time of said current in said motor phase coil when said current command changes from said higher value to said lower value.

5. The system for braking an electric motor according to claim 1 wherein said electronic circuit is a programmable processor containing a program for producing said current command required for braking.

6. A method of braking an electric motor system, the method comprising the steps of:
   providing
      a stator;
      an armature having a first armature pole;
      a first phase coil wound around the first armature pole;
      a first servo amplifier power stage electrically coupled to the first phase coil;
      a first command signal generator electrically coupled to the first servo amplifier power stage; and a first summing junction electrically coupled to the first command signal generator and the first servo amplifier power stage, and in response to a brake request signal being generated to the motor system, using the first servo amplifier power stage to generate a first sense signal indicative of whether a phase coil current in the first phase coil would accelerate or decelerate the armature;

using the first command signal generator to receive a first error signal from the first summing junction and to generate a first command signal to the first summing junction in response to the first error signal;

using the first summing junction to receive and combine the first command signal and the first sense signal so as to generate the first error signal; and using the first servo amplifier power stage to receive the first error signal and to generate a first phase coil current in the first phase coil so as to brake the armature motion.

* * * * *